ical aspheric cross-sectional curvature designed for
United States Patent [19]

Whitney et al.

[11] 4,181,409
[45] Jan. 1, 1980

[54] ASPHERIC LENS SERIES

[75] Inventors: Donald B. Whitney, Southbridge; James A. Reilly, Auburn; John M. Young, Southbridge, all of Mass.

[73] Assignee: American Optical Corporation, Southbridge, Mass.

[21] Appl. No.: 952,188

[22] Filed: Oct. 16, 1978

[51] Int. Cl.² .......................... G02B 3/04; G02C 7/02
[52] U.S. Cl. ...................... 351/167; 350/189; 351/176
[58] Field of Search ................. 350/189; 351/167, 176

[56] References Cited
U.S. PATENT DOCUMENTS

| | | | |
|---|---|---|---|
| 3,169,247 | 2/1965 | Davis et al. | 351/167 |
| 3,434,781 | 3/1969 | Davis et al. | 351/168 |
| 3,781,097 | 12/1973 | Bechtold | 351/167 |
| 4,073,578 | 2/1978 | Welsh | 351/167 |
| 4,128,304 | 12/1978 | Sussman | 350/189 |

*Primary Examiner*—John K. Corbin
*Assistant Examiner*—Scott J. Sugarman
*Attorney, Agent, or Firm*—Jeremiah J. Duggan; Alan H. Spencer; Stephen A. Schneeberger

[57] ABSTRACT

A series of non-lenticular ophthalmic lenses for use in the correction of aphakia having, in the case of each lens of the series, a front surface of rotationally symmetrical aspheric cross-sectional curvature designed for wide field of view with consideration of the aphakic eye as a dynamic optical system and geometry permitting cast-finishing to patient's prescription in currently fashionable large lens sizes with minimal weight, thickness and flatness allowing close fitting to the eye. The front surface aspheric coefficients are selected to overcome prior art rapid zero edge thickness conditions.

8 Claims, 3 Drawing Figures

ASPHERIC LENS SERIES

BACKGROUND OF THE INVENTION

1. Field of the Invention

Opthalmic lenses with particular reference to a series of lenses for use in the correction of aphakia and other low-vision defects.

2. Discussion of the Prior Art

In the correction of aphakia, it has long been recognized that spherical surfaces of the required strong positive powers cannot be adequately corrected for off-axis aberrations and, accordingly, severely restrict the wearer's field of useful vision.

While it has been suggested in U.S. Pat. No. 4,073,578, for example, that teaching an aphakic to rotate his head rather than his eyes for lateral viewing may avoid a need to improve or correct for lateral lens aberrations, the contrary is deemed more realistic, at least to the extent of providing for up to 30° degrees of corrected off-axis viewing. This is the direction taken according to the present invention. By correcting for lens aberrations, the more natural tendency to use the eye as a dynamic optical system is considered to afford greater comfort to the patient.

Heretofore, however, the correction of off-axis errors with aspheric lens surface shapes in the high-plus lenses needed for aphakics has proven to be less than fully satisfactory. The rapid approach to zero-edge thickness of conventionally designed aspherically corrected high-plus lenses severely restricts overall lens diametral size when center thickness is held within tolerances considered reasonable for avoiding excessive lens weight and adverse aesthetics.

For example, the use of high-positive power lenses for aphakics or other low-vision patients of the full-field type as in U.S. Pat. No. 3,781,097 suffers the aforesaid severe limitation in overall diametral size due to rapid approach to zero thickness or the alternative of accepting undue center thickness when attempting to meet current large lens diameter fashion trends. This lens geometry further renders direct cast-finishing of resin lenses difficult, if not impractical, and produces less than optimally shallow lenses needed for minimizing magnification by close fitting to the eye.

In the case of aspheric lenses designed according to U.S. Pat. No. 3,169,247, excessive center thickness is avoided by lenticulation which provides the overall diametral size needed for large eye-size spectacles frame glazing. The sharp delineation between central and marginal portions of the lens, however, is often considered aesthetically undesirable.

In view of the foregoing, it is a principal object of the present invention to provide a series of ophthalmic lenses for the correction of aphakia and other low-vision defects requiring high-positive power lenses wherewith;

(a) lenticulation and like surface delineations are avoided;

(b) greater than usual lens diametral size for accommodating currently fashionable spectacles frames can be accomplished without undue lens center thickness, bulkiness and weight;

(c) closer than usual fitting to the eye can be accomplished for minimizing magnification distortion;

(d) optical performance is maximized over a wide field of view; and (e) casting to finished prescription geometry is rendered highly practical.

Other objects and advantages of the invention will become apparent from the following description.

SUMMARY OF THE INVENTION

The invention accomplishes its objectives by the provision of a series of full-field lenses having convex aspheric base curvatures ranging from approximately 10 diopters to 16 diopters and each defined in cross-sectional curvature by the equation:

$$Z = AR^2 + DR^4 + ER^6 + FR^8 + GR^{10}$$

Aspheric coefficients determined by precise ray tracing calculations are employed according to principles of the present design to force the provision of a lens-edge thickness suitable for glazing currently fashionable large spectacles frames. By such means, rapid zero-edge thickness conditions of the prior art are avoided, optimum correction of off-axis aberrations over a large field of view (e.g. 60° measured on the eye side of the lens) is accomplished and thinner, shallower, lighter-weight lens geometries are provided for closer fitting to the eye.

Details of the invention will become more readily apparent from the following description when taken in conjunction with the accompanying drawings.

DESCRIPTION OF THE PREFERRED EMBODIMENTS

Figure 1:
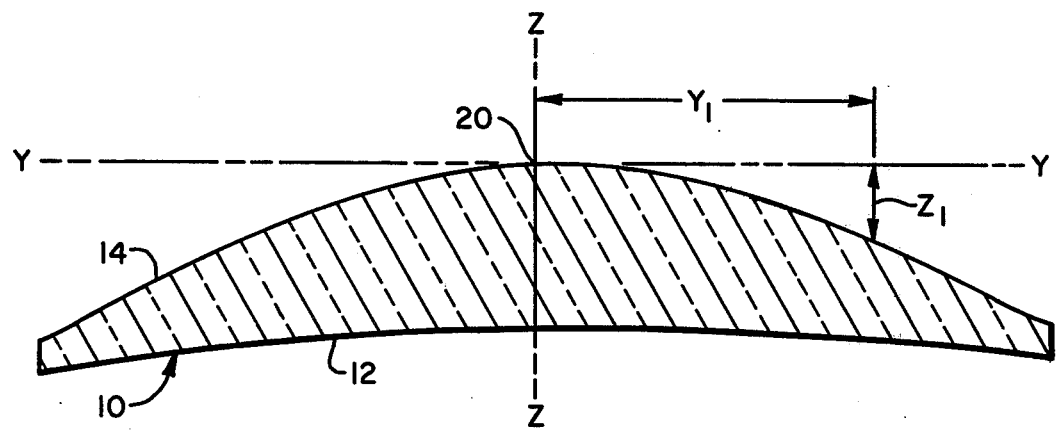
FIG. 1 illustrates, in enlarged cross-section, the configuration of an exemplary lens of the series of the present invention.
Figure 2:
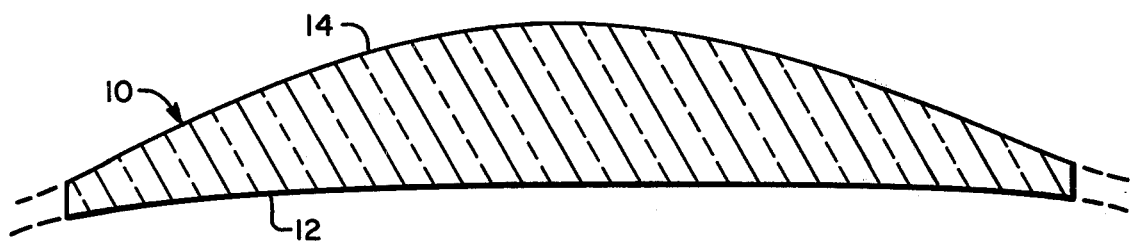
FIG. 2 is another similar view of the lens wherein development of its edge contour according to principles of the invention is emphasized with broken line illustration.

Referring to the drawings, lens 10 (FIGS. 1 and 2) has concave occular surface 12 and convex front or object surface 14, the latter being a rotationally symmetrical aspheric curvature forced in design to avoid the prior art condition of rapid zero edge as illustrated with broken lines (FIG. 2) and thereby accommodate the current large lens size fashion trend without undue center thickness, weight and general ingainliness.

Figure 3:
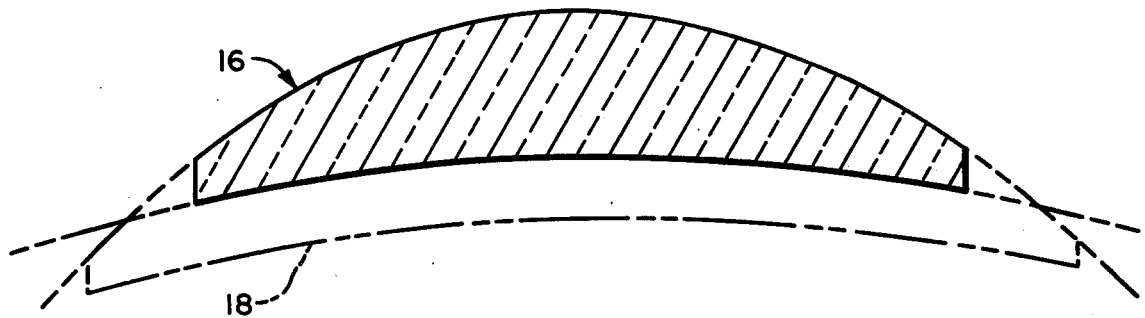
FIG. 3 is a cross-sectional view of a prior art form of a correspondingly powered lens, depicting with broken line illustration the rapid zero edge thickness condition avoided by the present invention.

The condition of rapid zero-edge thickness in prior art design is illustrated in FIG. 3. Lens 16 of substantially the same spherical power as lens 10 and having approximately the same edge thickness can be seen to be of considerably smaller diametral size than lens 10 (FIG. 2) and to reach zero-edge thickness (as shown by broken lines) at a diametral size still less than that of lens 10. In order to reach the diametral dimension of lens 10 according to prior art design principles, lens 16 would require excessive axial thickening to approximately the extent depicted by dot-dash outline 18 thereby rendering lens 16 unacceptable.

A further feature of lenses designed according to the present invention (e.g. lens 10) resides in the shallowness of occular curvature 12 which permits closer than usual fitting to the patient's eye. This affords the well-known advantage of aesthetically reducing magnification of the eye and minimizing the corresponding visual affect to the patient.

Front surface 14 of lens 10 (FIGS. 1 and 2) is provided with an aspheric shape defined by a tenth degree polynomial including only the even-powered terms which can be written as follows:

$$Z = CR^2/[1 + 1(K+1)C^2R^2] + DR^4 + ER^6 + FR^8 + GR^{10} \quad (EQ.\ 1)$$

This describes a surface which has the Z-axis as its axis of revolution with the other two axes X and Y of the rectangular system being used to define the parameter R as:

$$R^2 = X^2 + Y^2 \quad (EQ.\ 2)$$

Axis X, which is not shown in the drawings, extends through vertex 20 of lens 10 perpendicularly to the sheet of drawings and is otherwise identical to the Y component.

The coefficients D, E, F and G are used to express the generalized aspheric surface beyond a simple conic section which results when the four coefficients are equal to zero. C is the vertex curvature and K is called the conic constant. In the present invention, K is chosen for convenience to be equal to $-1$, putting EQ. 1 in the form:

$$Z = AR^2 + DR^4 + ER^6 + FR^8 + GR^{10} \quad (EQ.\ 3)$$

This, $$A\ \text{equals}\ C/2 \quad (EQ.\ 4)$$

where:

Z is the distance $Z_1$ from the front surface vertex 20 to any selected point P on the surface 14 of lens 10 taken in a direction parallel to the optical axis Z—Z;

R is the distance $Y_1$ from axis Z—Z perpendicularly to point P; and

A, D, E, F and G are aspheric coefficients selected to afford the desired surface 14 shape.

In order to accomplish the extended edge condition and shallow occular surface 12 (FIGS. 1 and 2) of the present lens series design together with optimum correction of off-axis aberrations (particularly those of greatest concern in opthalmic lens design such as astigmatism and power error) to the extent of providing for good vision in directions outwardly to at least 30° from the lens optical axis, the selection of aspheric coefficients A, D, E, F and G in Table I which follows are employed for the indicated sphere powers:

TABLE I

| ASPH BASE | A | D | E | F | G |
|---|---|---|---|---|---|
| 10.00 | $1.10632 \times 10^{-2}$ | $6.29539 \times 10^{-7}$ | $-1.67629 \times 10^{-9}$ | $1.02592 \times 10^{-11}$ | $-1.68744 \times 10^{-14}$ |
| 10.50 | $1.14659 \times 10^{-2}$ | $6.29539 \times 10^{-7}$ | $-5.42420 \times 10^{-10}$ | $6.77477 \times 10^{-12}$ | $-1.30897 \times 10^{-14}$ |
| 11.00 | $1.18786 \times 10^{-2}$ | $6.29539 \times 10^{-7}$ | $5.91442 \times 10^{-10}$ | $3.29033 \times 10^{-12}$ | $-9.28702 \times 10^{-15}$ |
| 11.50 | $1.23150 \times 10^{-2}$ | $6.29539 \times 10^{-7}$ | $3.98467 \times 10^{-10}$ | $7.04316 \times 10^{-12}$ | $-1.60567 \times 10^{-14}$ |
| 12.00 | $1.27490 \times 10^{-2}$ | $6.29539 \times 10^{-7}$ | $2.05492 \times 10^{-10}$ | $1.07960 \times 10^{-11}$ | $-2.28264 \times 10^{-14}$ |
| 12.50 | $1.31806 \times 10^{-2}$ | $7.85654 \times 10^{-7}$ | $2.83754 \times 10^{-10}$ | $1.14007 \times 10^{-11}$ | $-2.56596 \times 10^{-14}$ |
| 13.00 | $1.36099 \times 10^{-2}$ | $9.41769 \times 10^{-7}$ | $3.62016 \times 10^{-10}$ | $1.20054 \times 10^{-11}$ | $-2.84928 \times 10^{-14}$ |
| 13.50 | $1.39461 \times 10^{-2}$ | $1.05656 \times 10^{-6}$ | $1.01270 \times 10^{-9}$ | $9.88025 \times 10^{-12}$ | $-2.54608 \times 10^{-14}$ |
| 14.00 | $1.42972 \times 10^{-2}$ | $1.17136 \times 10^{-6}$ | $1.6639 \times 10^{-9}$ | $7.75510 \times 10^{-12}$ | $-2.24288 \times 10^{-14}$ |
| 14.50 | $1.46813 \times 10^{-2}$ | $1.28124 \times 10^{-6}$ | $1.82120 \times 10^{-9}$ | $8.38095 \times 10^{-12}$ | $-2.38066 \times 10^{-14}$ |
| 15.00 | $1.50448 \times 10^{-2}$ | $1.39112 \times 10^{-6}$ | $1.97901 \times 10^{-9}$ | $9.01109 \times 10^{-12}$ | $-2.51844 \times 10^{-14}$ |
| 15.50 | $1.54484 \times 10^{-2}$ | $1.63060 \times 10^{-6}$ | $9.12271 \times 10^{-10}$ | $1.43122 \times 10^{-11}$ | $-3.25552 \times 10^{-14}$ |
| 16.00 | $1.58495 \times 10^{-2}$ | $1.87007 \times 10^{-6}$ | $-1.54467 \times 10^{-10}$ | $1.96134 \times 10^{-11}$ | $-3.99260 \times 10^{-14}$ |

It should be understood that the aspheric coefficients A, D, E, F and G of Table I were determined by the well-known technique of ray tracing with computer assisted evaluations of the refraction of rays as they travel through the lenses with the purpose of minimizing tangential and sagittal power errors while giving consideration to lens center and edge thicknesses. This manner of determining the aforesaid aspheric coefficients being well known to those skilled in the art need not, and will not, be further explained herein. Those interested in details of ray tracing in lens design work may refer to U.S. Pat. Nos. 3,169,247 and 3,434,781.

According to the aforesaid lens series design criteria, Tangential power error is held to a maximum of 0.25 diopter for a condition of 23 mm center of rotation (i.e. distance from the center of rotation of the eye to the vertex of the occular surface 12) and within a 60° field of view measured on the eye side of the lens with an edge thickness of between 1 and 2 mm is developed for lenses of approximately 52 mm in diameter. The front surface curvature may be modified to retain comparable edge thicknesses at larger diameters, e.g. by blending to an appropriate spherical curvature beyond the aforesaid 52 mm in diameter.

The following Table II illustrates Tangential (T) and Sagittal (S) power errors at five field angles for the indicated powers computed for 23 mm center of rotation distance.

TABLE II

| VERTEX POWER | $T^{10°}$ | S | $T^{15°}$ | S | $T^{20°}$ | S | $T^{25°}$ | S | $T^{30°}$ | S | LENS THK (IN mm) |
|---|---|---|---|---|---|---|---|---|---|---|---|
| 10.00 | −.01 | −.04 | −.02 | −.10 | −.01 | −.18 | +.08 | −.27 | +.08 | −.37 | 8.0 |
| 10.50 | −.12 | −.05 | −.04 | −.11 | −.01 | −.19 | +.09 | −.28 | +.04 | −.40 | 8.5 |
| 11.00 | −.04 | −.06 | −.05 | −.13 | −.01 | −.21 | +.09 | −.30 | +.00 | −.42 | 8.8 |
| 11.50 | −.06 | −.07 | −.10 | −.15 | −.05 | −.24 | +.11 | −.34 | +.06 | −.45 | 8.8 |
| 12.00 | −.09 | −.08 | −.15 | −.17 | −.11 | −.28 | +.11 | −.38 | +.10 | −.49 | 8.8 |
| 12.50 | −.09 | −.08 | −.15 | −.18 | −.10 | −.29 | +.10 | −.39 | −.04 | −.51 | 8.8 |
| 13.00 | −.10 | −.09 | −.16 | −.19 | −.10 | −.30 | +.08 | −.41 | −.20 | −.54 | 8.8 |

TABLE II-continued

| VERTEX POWER | $T^{100}$ | S | $T^{150}$ | S | $T^{200}$ | S | $T^{250}$ | S | $T^{300}$ | S | LENS THK (IN mm) |
|---|---|---|---|---|---|---|---|---|---|---|---|
| 13.50 | −.10 | −.09 | −.16 | −.19 | −.08 | −.31 | +.11 | −.42 | −.22 | −.55 | 9.5 |
| 14.00 | −.11 | −.10 | −.16 | −.21 | −.06 | −.32 | +.14 | −.42 | −.22 | −.57 | 10.0 |
| 14.50 | −.12 | −.10 | −.18 | −.22 | −.08 | −.34 | +.14 | −.45 | −.22 | −.59 | 10.2 |
| 15.00 | −.14 | −.11 | −.20 | −.23 | −.09 | −.36 | +.15 | −.47 | −.24 | −.61 | 10.5 |
| 15.50 | −.14 | −.11 | −.22 | −.24 | −.12 | −.37 | +.15 | −.49 | −.20 | −.63 | 10.5 |
| 16.00 | −.15 | −.12 | −.25 | −.25 | −.16 | −.39 | +.15 | −.51 | −.19 | −.66 | 10.5 |

The foregoing lens series design providing lens sphere powers included in the illustrated range of from 10.00 to 16.00 diopters with extended edges avoiding prior art zero-edge thickness conditions provides a lens geometry optimally suited for direct casting to finished patient's prescription requirements. Lenses of the present series may be modified for multifocal use by the addition of conventional near and/or intermediate viewing segments. It should be understood, however, that lens blanks requiring second-side (occular side) machine finishing may be provided with aspheric base curvatures 14 and subsequently machine finished, if desired.

While lenses designed according to this invention may be formed of glass, it is for obvious reasons preferable to use materials of optical quality plastics which can be molded or cast, (e.g. polycarbonate or allyl diglycol carbonate).

The present lens series design is readily adaptable to receiving conventional cylinder correction as illustrated in the following Table III wherein appropriate concave occular surface curvatures are listed together with an aspheric base curve selection for the indicated lens sphere powers. Table III is calculated to provide occular surface curvatures for lenses formed of plastics having refractive indices of approximately 1.495 with tools or casting surfaces of standard design, i.e. those designed according to the requirements of 1.53 refractive index lens materials.

It will become readily apparent to those skilled in the art that there are various other modifications and adaptations of the precise form of the invention here shown and described. Accordingly, the foregoing illustration is not to be interpreted as restrictive of the invention beyond that necessitated by the following claims:

We claim:

1. A series of ophthalmic lenses having vertex powers extending over a range including 10 to 16 diopters wherein each lens of said series has a concave ocular surface and a convex rotationally symmetrical aspheric front surface, said ocular and front surfaces being aligned along an optical axis of said lens and said front surface being defined by the equation $$Z = AR^2 + DR^4 + ER^6 + FR^8 + GR^{10}$$

wherein

Z is the distance parallel to the lens optical axis from the vertex of said front surface to any point on said front surface;

R is the perpendicular distance from said optical axis to said point on said front surface and A,D,E,F and G are aspheric coefficients selected to afford lens features including:
  avoidance of zero-edge thickness;
  provision of optimum shallowness of ocular surface curvature for close fitting to user's eye;
  maximized optical performance throughout a central field of view of at least 60°; and
  adaptability to direct prescription-finished casting.

TABLE III

| LENS SPHERE POWER | CYLINDER POWERS | | | | | | | | | | | | | ASPH BASE |
|---|---|---|---|---|---|---|---|---|---|---|---|---|---|---|
| | 0.00 | −0.25 | −0.50 | −0.75 | −1.00 | −1.25 | −1.50 | −1.75 | −2.00 | −2.25 | −2.50 | −2.75 | −3.00 | |
| 10.00 | −1.75 | −2.02 | −2.28 | −2.55 | −2.82 | −3.09 | −3.35 | −3.62 | −3.89 | −4.16 | −4.42 | −4.70 | −4.96 | 10.00 |
| 10.25 | −2.02 | −2.28 | −2.55 | −2.82 | −3.09 | −3.35 | −3.62 | −3.89 | −4.16 | −4.42 | −4.70 | −4.96 | −5.22 | 10.50 |
| 10.50 | −1.75 | −2.02 | −2.28 | −2.55 | −2.82 | −3.09 | −3.35 | −3.62 | −3.89 | −4.16 | −4.42 | −4.70 | −4.96 | 10.50 |
| 10.75 | −2.02 | −2.28 | −2.55 | −2.82 | −3.09 | −3.35 | −3.62 | −3.89 | −4.16 | −4.42 | −4.70 | −4.96 | −5.23 | 11.00 |
| 11.00 | −1.75 | −2.02 | −2.28 | −2.55 | −2.82 | −3.09 | −3.35 | −3.62 | −3.89 | −4.16 | −4.42 | −4.70 | −4.96 | 11.00 |
| 11.25 | −2.02 | −2.28 | −2.55 | −2.82 | −3.09 | −3.35 | −3.62 | −3.89 | −4.16 | −4.42 | −4.70 | −4.96 | −5.22 | 11.50 |
| 11.50 | −1.75 | −2.02 | −2.28 | −2.55 | −2.82 | −3.09 | −3.35 | −3.62 | −3.89 | −4.16 | −4.42 | −4.70 | −4.96 | 11.50 |
| 11.75 | −2.02 | −2.28 | −2.55 | −2.82 | −3.09 | −3.35 | −3.62 | −3.89 | −4.16 | −4.42 | −4.70 | −4.96 | −5.22 | 12.00 |
| 12.00 | −1.75 | −2.02 | −2.28 | −2.55 | −2.82 | −3.09 | −3.35 | −3.62 | −3.89 | −4.16 | −4.42 | −4.70 | −4.96 | 12.00 |
| 12.25 | −2.02 | −2.28 | −2.55 | −2.82 | −3.09 | −3.35 | −3.62 | −3.89 | −4.16 | −4.42 | −4.70 | −4.96 | −5.23 | 12.50 |
| 12.50 | −1.75 | −2.02 | −2.28 | −2.55 | −2.82 | −3.09 | −3.35 | −3.62 | −3.89 | −4.16 | −4.42 | −4.70 | −4.96 | 12.50 |
| 12.75 | −2.02 | −2.28 | −2.55 | −2.82 | −3.09 | −3.35 | −3.63 | −3.89 | −4.16 | −4.42 | −4.70 | −4.96 | −5.23 | 13.00 |
| 13.00 | −1.75 | −2.02 | −2.28 | −2.55 | −2.82 | −3.09 | −3.36 | −3.62 | −3.89 | −4.16 | −4.42 | −4.70 | −4.96 | 13.00 |
| 13.25 | −2.02 | −2.28 | −2.55 | −2.82 | −3.09 | −3.35 | −3.62 | −3.89 | −4.16 | −4.42 | −4.70 | −4.96 | −5.23 | 13.50 |
| 13.50 | −1.75 | −2.02 | −2.28 | −2.55 | −2.82 | −3.09 | −3.35 | −3.62 | −3.89 | −4.16 | −4.42 | −4.69 | −4.96 | 13.50 |
| 13.75 | −2.02 | −2.28 | −2.55 | −2.83 | −3.09 | −3.35 | −3.62 | −3.89 | −4.16 | −4.42 | −4.70 | −4.96 | −5.24 | 14.00 |
| 14.00 | −1.76 | −2.02 | −2.28 | −2.55 | −2.82 | −3.09 | −3.35 | −3.62 | −3.89 | −4.16 | −4.42 | −4.70 | −4.96 | 14.00 |
| 14.25 | −2.02 | −2.28 | −2.55 | −2.82 | −3.09 | −3.35 | −3.62 | −3.89 | −4.16 | −4.42 | −4.70 | −4.96 | −5.23 | 14.50 |
| 14.50 | −1.75 | −2.02 | −2.28 | −2.55 | −2.82 | −3.09 | −3.35 | −3.62 | −3.89 | −4.16 | −4.42 | −4.70 | −4.96 | 14.50 |
| 14.75 | −2.02 | −2.28 | −2.55 | −2.82 | −3.09 | −3.35 | −3.62 | −3.89 | −4.16 | −4.42 | −4.70 | −4.96 | −5.23 | 15.00 |
| 15.00 | −1.75 | −2.02 | −2.28 | −2.55 | −2.82 | −3.09 | −3.35 | −3.62 | −3.89 | −4.16 | −4.42 | −4.70 | −4.96 | 15.00 |
| 15.25 | −2.02 | −2.28 | −2.55 | −2.82 | −3.09 | −3.35 | −3.62 | −3.89 | −4.16 | −4.42 | −4.70 | −4.96 | −5.24 | 15.50 |
| 15.50 | −1.76 | −2.02 | −2.28 | −2.55 | −2.82 | −3.09 | −3.35 | −3.62 | −3.89 | −4.16 | −4.42 | −4.70 | −4.96 | 15.50 |
| 15.75 | −2.02 | −2.28 | −2.55 | −2.82 | −3.09 | −3.35 | −3.62 | −3.89 | −4.16 | −4.42 | −4.70 | −4.96 | −5.23 | 16.00 |
| 16.00 | −1.75 | −2.02 | −2.28 | −2.55 | −2.82 | −3.09 | −3.35 | −3.62 | −3.89 | −4.16 | −4.42 | −4.70 | −4.96 | 16.00 |

2. A series of ophthalmic lenses according to claim 1 wherein said selection of said aspheric coefficients for maximum optical performance provides for tangential power error in each lens of substantially no greater than 0.25 diopters over all parts of a central field of 60° for a center of rotation distance of 23 mm.

3. A series of ophthalmic lenses having vertex powers extending over a range including 10 to 16 diopters wherein each lens of said series has a concave ocular surface and a convex rotationally symmetrical aspheric front surface, said ocular and front surfaces being aligned along an optical axis of said lens and said front surface being defined by the equation $$Z = AR^2 + DR^4 + ER^6 + FR^8 + GR^{10}$$

wherein

Z is the distance parallel to the lens optical axis from the vertex of said front surface to any point on said front surface;

R is the perpendicular distance from said optical axis to said point on said front surface and A, D, E, F and G are aspheric coefficients selected to afford lens features including:
 avoidance of zero-edge thickness;
 provision of optimum shallowness of ocular surface curvature for close fitting to user's eye;
 maximized optical performance throughout a central field of view of at least 60°; and
 adaptability to direct prescription-finished casting;
 said aspheric coefficients having approximately the values taken from the following table:

| ASPH BASE | ASPHERIC COEFFICIENTS | | | | |
|---|---|---|---|---|---|
| | A | D | E | F | G |
| 10.00 | $1.10632 \times 10^{-2}$ | $6.29539 \times 10^{-7}$ | $-1.67629 \times 10^{-9}$ | $1.02592 \times 10^{-11}$ | $-1.68744 \times 10^{-14}$ |
| 10.50 | $1.14659 \times 10^{-2}$ | $6.29539 \times 10^{-7}$ | $-5.42420 \times 10^{-10}$ | $6.77477 \times 10^{-12}$ | $-1.30897 \times 10^{-14}$ |
| 11.00 | $1.18786 \times 10^{-2}$ | $6.29539 \times 10^{-7}$ | $5.91442 \times 10^{-10}$ | $3.29033 \times ^{-12}$ | $-9.28702 \times 10^{-15}$ |
| 11.50 | $1.23150 \times 10^{-2}$ | $6.29539 \times 10^{-7}$ | $3.98467 \times 10^{-10}$ | $7.04316 \times 10^{-12}$ | $-1.60567 \times 10^{-14}$ |
| 12.00 | $1.27490 \times 10^{-2}$ | $6.29539 \times 10^{-7}$ | $2.05492 \times 10^{-10}$ | $1.07960 \times 10^{-11}$ | $-2.28264 \times 10^{-14}$ |
| 12.50 | $1.31806 \times 10^{-2}$ | $7.85654 \times 10^{-7}$ | $2.83754 \times 10^{-10}$ | $1.14007 \times 10^{-11}$ | $-2.56596 \times 10^{-14}$ |
| 13.00 | $1.36099 \times 10^{-2}$ | $9.41769 \times 10^{-7}$ | $3.62016 \times 10^{-10}$ | $1.20054 \times 10^{-11}$ | $-2.84928 \times 10^{-14}$ |
| 13.50 | $1.39461 \times 10^{-2}$ | $1.05656 \times 10^{-6}$ | $1.01270 \times 10^{-9}$ | $9.88025 \times 10^{-12}$ | $-2.54608 \times 10^{-14}$ |
| 14.00 | $1.42972 \times 10^{-2}$ | $1.17136 \times 10^{-6}$ | $1.66339 \times 10^{-9}$ | $7.75510 \times 10^{-12}$ | $-2.24288 \times 10^{-14}$ |
| 14.50 | $1.46813 \times 10^{-2}$ | $1.28124 \times 10^{-6}$ | $1.82120 \times 10^{-9}$ | $8.38095 \times 10^{-12}$ | $-2.38066 \times 10^{-14}$ |
| 15.00 | $1.50448 \times 10^{-2}$ | $1.39112 \times 10^{-6}$ | $1.97901 \times 10^{-9}$ | $9.01109 \times 10^{-12}$ | $-2.51844 \times 10^{-14}$ |
| 15.50 | $1.54484 \times 10^{-2}$ | $1.63060 \times 10^{-6}$ | $9.12271 \times 10^{-10}$ | $1.43122 \times 10^{-11}$ | $-3.25552 \times 10^{-14}$ |
| 16.00 | $1.58495 \times 10^{-2}$ | $1.87007 \times 10^{-6}$ | $-1.54467 \times 10^{-10}$ | $1.96134 \times 10^{-11}$ | $-3.99260 \times 10^{-14}$ |

4. A series of ophthalmic lenses according to claim 3 wherein for center of rotation distance of approximately 23 mm, tangential power error in each lens is substantially no greater than 0.25 diopter over said central field of view of approximately 60 degrees.

5. An ophthalmic lens having a concave ocular surface and a convex rotationally symmetrical aspheric front surface, said ocular and front surfaces being aligned along an optical axis and said front surface being defined by the equation $$Z = AR^2 + DR^4 + ER^6 + FR^8 + GR^{10}$$

wherein

Z is the distance parallel to the lens optical axis from the vertex of said front surface to any point on said front surface;

R is the perpendicular distance from said optical axis to said point on said front surface; and A, D, E, F and G are aspheric coefficients selected to afford lens features including:
 avoidance of zero-edge thickness;
 provision of optimum shallowness of ocular surface curvature for close fitting to user's eye;
 maximized optical performance throughout a central field of view of at least 60°; and
 adaptability to direct prescription-finished casting.

6. An ophthalmic lens according to claim 5 wherein said selection of said aspheric coefficients for maximum optical performance provides for tangential power error in said lens of substantially no greater than 0.25 diopters over all parts of a central field of approximately 60° for a center of rotation distance of approximately 23 mm.

7. An ophthalmic lens having a concave ocular surface and a convex rotationally symmetrical aspheric front surface, said ocular and front surfaces being aligned along an optical axis and said front surface being defined by the equation $$Z = AR^2 + DR^4 + ER^6 + FR^8 + GR^{10}$$

wherein

Z is the distance parallel to the lens optical axis from the vertex of said front surface to any point on said front surface;

R is the perpendicular distance from said optical axis to said point on said front surface; and A, D, E, F and G are aspheric coefficients selected to afford lens features including:
 avoidance of zero-edge thickness;
 provision of optimum shallowness of ocular surface curvature for close fitting to user's eye;
 maximized optical performance throughout a central field of view of at least 60°; and
 adaptability to direct prescription-finished casting;
 said aspheric coefficients having approximately the values taken from the following table:

| ASPH BASE | ASPHERIC COEFFICIENTS | | | | |
|---|---|---|---|---|---|
| | A | D | E | F | G |
| 10.00 | $1.10632 \times 10^{-2}$ | $6.29539 \times 10^{-7}$ | $-1.67629 \times 10^{-9}$ | $1.02592 \times 10^{-11}$ | $-1.68744 \times 10^{-14}$ |
| 10.50 | $1.14659 \times 10^{-2}$ | $6.29539 \times 10^{-7}$ | $-5.42420 \times 10^{-10}$ | $6.77477 \times 10^{-12}$ | $-1.30897 \times 10^{-14}$ |
| 11.00 | $1.18786 \times 10^{-2}$ | $6.29539 \times 10^{-7}$ | $5.91442 \times 10^{-10}$ | $3.29033 \times 10^{-12}$ | $-9.28702 \times 10^{-15}$ |
| 11.50 | $1.23150 \times 10^{-2}$ | $6.29539 \times 10^{-7}$ | $3.98467 \times 10^{-10}$ | $7.04316 \times 10^{-12}$ | $-1.60567 \times 10^{-14}$ |
| 12.00 | $1.27490 \times 10^{-2}$ | $6.29539 \times 10^{-7}$ | $2.05492 \times 10^{-10}$ | $1.07960 \times 10^{-11}$ | $-2.28264 \times 10^{-14}$ |

-continued

| ASPH BASE | ASPHERIC COEFFICIENTS | | | | |
|---|---|---|---|---|---|
| | A | D | E | F | G |
| 12.50 | $1.31806 \times 10^{-2}$ | $7.85654 \times 10^{-7}$ | $2.83754 \times 10^{-10}$ | $1.14007 \times 10^{-11}$ | $-2.56596 \times 10^{-14}$ |
| 13.00 | $1.36099 \times 10^{-2}$ | $9.41769 \times 10^{-7}$ | $3.62016 \times 10^{-10}$ | $1.20054 \times 10^{-11}$ | $-2.84928 \times 10^{-14}$ |
| 13.50 | $1.39461 \times 10^{-2}$ | $1.05656 \times 10^{-6}$ | $1.01270 \times 10^{-9}$ | $9.88025 \times 10^{-12}$ | $-2.54608 \times 10^{-14}$ |
| 14.00 | $1.42972 \times 10^{-2}$ | $1.17136 \times 10^{-6}$ | $1.66339 \times 10^{-9}$ | $7.75510 \times 10^{-12}$ | $-2.24288 \times 10^{-14}$ |
| 14.50 | $1.46813 \times 10^{-2}$ | $1.28124 \times 10^{-6}$ | $1.82120 \times 10^{-9}$ | $8.38095 \times 10^{-12}$ | $-2.38066 \times 10^{-14}$ |
| 15.00 | $1.50448 \times 10^{-2}$ | $1.39112 \times 10^{-6}$ | $1.97901 \times 10^{-9}$ | $9.01109 \times 10^{-12}$ | $-2.51844 \times 10^{-14}$ |
| 15.50 | $1.54484 \times 10^{-2}$ | $1.63060 \times 10^{-6}$ | $9.12271 \times 10^{-10}$ | $1.43122 \times 10^{-11}$ | $-3.25552 \times 10^{-14}$ |
| 16.00 | $1.58495 \times 10^{-2}$ | $1.87007 \times 10^{-6}$ | $-1.54467 \times 10^{-10}$ | $1.96134 \times 10^{-11}$ | $-3.99260 \times 10^{-14}$ |

8. An ophthalmic lens according to claim 7 wherein for center of rotation distance of approximately 23 mm, tangential power error is substantially no greater than 0.25 diopter over said central field of view of approximately 60 degrees.

* * * * *